(12) United States Patent
Zhao et al.

(10) Patent No.: US 12,556,706 B2
(45) Date of Patent: Feb. 17, 2026

(54) SYSTEMS AND METHODS FOR ADAPTIVE MOTION VECTOR PREDICTION LIST CONSTRUCTION

(71) Applicant: Tencent America LLC, Palo Alto, CA (US)

(72) Inventors: Liang Zhao, Palo Alto, CA (US); Xin Zhao, Palo Alto, CA (US); Han Gao, Palo Alto, CA (US); Jing Ye, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/669,375

(22) Filed: May 20, 2024

(65) Prior Publication Data

US 2025/0142071 A1    May 1, 2025

Related U.S. Application Data

(60) Provisional application No. 63/546,909, filed on Nov. 1, 2023.

(51) Int. Cl.
*H04N 19/105* (2014.01)
*H04N 19/129* (2014.01)
*H04N 19/176* (2014.01)

(52) U.S. Cl.
CPC ......... *H04N 19/129* (2014.11); *H04N 19/105* (2014.11); *H04N 19/176* (2014.11)

(58) Field of Classification Search
None
See application file for complete search history.

(56) References Cited

U.S. PATENT DOCUMENTS

| | | |
|---|---|---|
| 2011/0280300 A1 | 11/2011 | Tourapis et al. |
| 2015/0288970 A1 | 10/2015 | Park et al. |
| 2016/0381382 A1 | 12/2016 | Oh et al. |
| 2020/0413082 A1 | 12/2020 | Li et al. |
| 2021/0021825 A1 | 1/2021 | Zheng et al. |

(Continued)

OTHER PUBLICATIONS

Han Gao et al., "Motion Vector Predictor List Improvements", Document: CWG-C043_v3, The Alliance for Open Media, Codec Working Group, Jun. 2022, 5 pgs.

(Continued)

*Primary Examiner* — Christopher G Findley
(74) *Attorney, Agent, or Firm* — Morgan, Lewis & Bockius LLP

(57) ABSTRACT

An example method of video coding includes receiving a video bitstream that includes a plurality of blocks. The method also includes determining a scanning order for a motion vector list for a first block of the plurality of blocks based on one or more of: a number of neighboring blocks of the current block with corresponding temporal motion vectors, a number of neighboring blocks of the current block encoded in an inter prediction mode, a mode of the current block, and a reference frame index for the current block. The method further includes generating the motion vector list according to the scanning order and identifying, from the motion vector list, a motion vector predictor for the current block. The method also includes decoding the current block using the identified motion vector predictor.

20 Claims, 8 Drawing Sheets

(56) References Cited

U.S. PATENT DOCUMENTS

2021/0037257 A1\* 2/2021 Lee ................. H04N 19/176
2021/0127134 A1\* 4/2021 Jeong ................ H04N 19/593

OTHER PUBLICATIONS

Peter de Rivaz et al., "AV1 Bitstream & Decoding Process Specification", Version 1.0.0 with Errata 1, The Alliance for Open Media, Jan. 2019, 681 pgs.
Tencent America LLC, ISRWO, PCT/US2024/030574, Aug. 7, 2024, 10 pgs.

\* cited by examiner

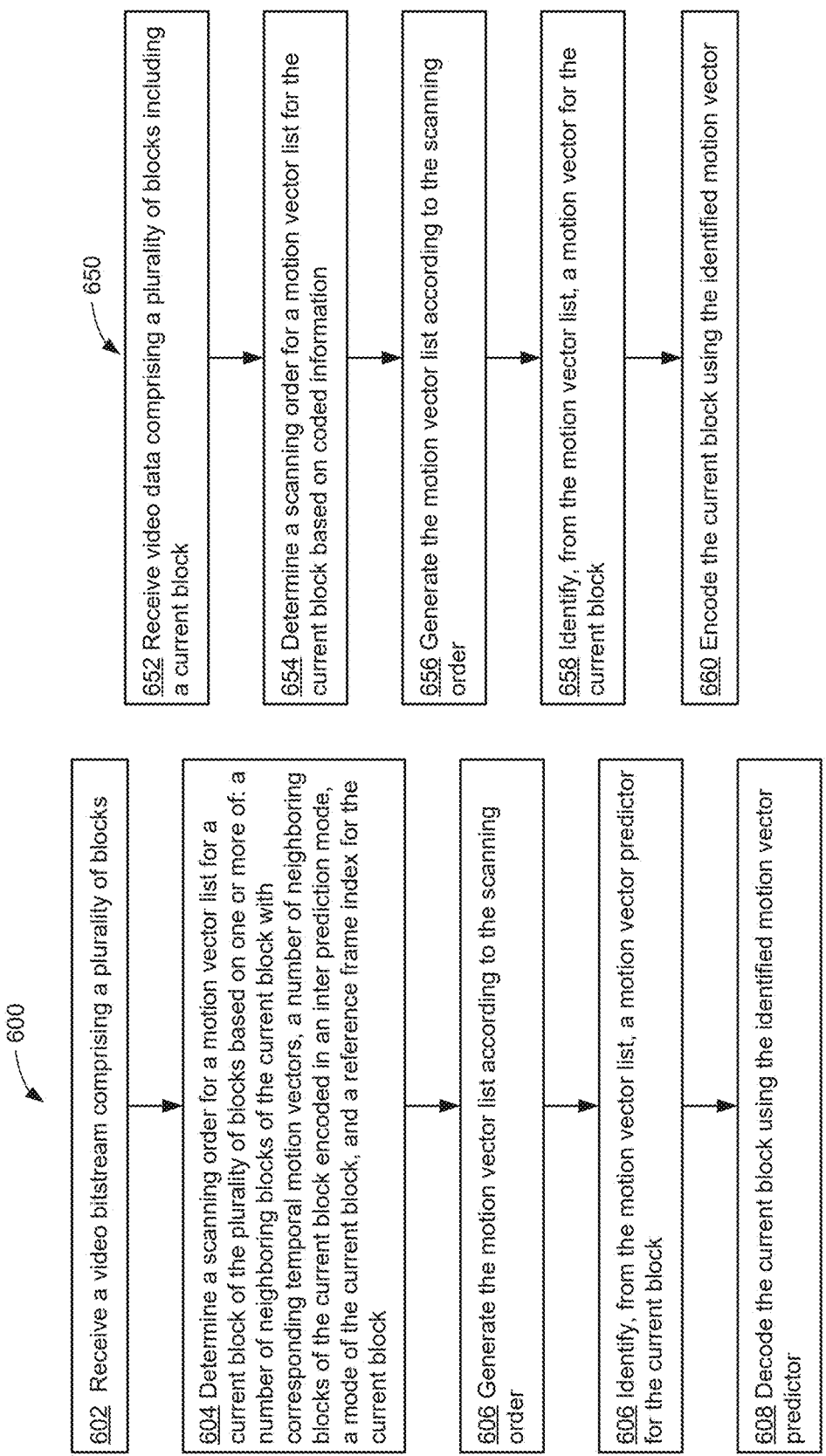

SYSTEMS AND METHODS FOR ADAPTIVE MOTION VECTOR PREDICTION LIST CONSTRUCTION

RELATED APPLICATIONS

This application claims priority to U.S. Provisional Patent Application No. 63/546,909, entitled "Adaptive Motion Vector Prediction List Construction" filed Nov. 1, 2023, which is hereby incorporated by reference in its entirety.

TECHNICAL FIELD

The disclosed embodiments relate generally to video coding, including but not limited to systems and methods for using inter prediction modes and constructing motion vector lists.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes, amongst other things, a set of techniques for video (image) compression related to inter prediction modes and deriving motion vector predictors. Some embodiments include constructing a motion vector predictor (MVP) list for use with identifying an MVP for a current video block. The ordering of the MVP list is important for using a more accurate motion vector (MV) with a lower index value. A scanning order of motion vector candidates for the MVP list can be used to set the ordering in the MVP list. Some embodiments include determining the scanning order based on coded information (such as prediction mode of neighboring blocks, reference frame information, and/or current block attributes). Determining the scanning order of MVs based on coded information enables a higher probability of use of a more accurate MV with lower index value, thereby increasing efficiency and accuracy of the video decoding.

In accordance with some embodiments, a method of video decoding includes: (i) receiving a video bitstream comprising a plurality of blocks; (ii) determining a scanning order for a motion vector list for a current block of the plurality of blocks based on one or more of: (a) a number of neighboring blocks of the current block with corresponding temporal motion vectors; (b) a number of neighboring blocks of the current block encoded in an inter prediction mode; (c) a mode of the current block; and (d) a reference frame index for the current block; (iii) generating the motion vector list according to the scanning order; (iv) identifying, from the motion vector list, a motion vector predictor for the current block; and (v) decoding the current block using the identified motion vector predictor.

In accordance with some embodiments, a method of video encoding includes (i) receiving video data comprising a plurality of blocks including a current block; (ii) determining a scanning order for a motion vector list for the current block based on coded information; (iii) generating the motion vector list according to the scanning order; (iv) identifying, from the motion vector list, a motion vector for the current block; and (v) encoding the current block using the identified motion vector.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder). In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 6A illustrates an example video decoding process in accordance with some embodiments.

FIG. 6B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

The present disclosure describes video/image compression techniques including inter prediction and motion vector list construction. For example, when deriving an MVP for a current block, a scanning order of spatial motion vectors, temporal motion vectors, and derived motion vectors may depend on coded information from the video bitstream. The coded information may include a number of neighboring blocks of the current block with corresponding temporal motion vectors, a number of neighboring blocks of the current block encoded in an inter prediction mode, a mode of the current block, and/or a reference frame index for the current block. Determining a scanning order based on coded information increases the odds of selecting the most appropriate motion vector at a lower index value, which improves the efficiency and accuracy of the video decoding.

Example Systems and Devices

Figure 1:
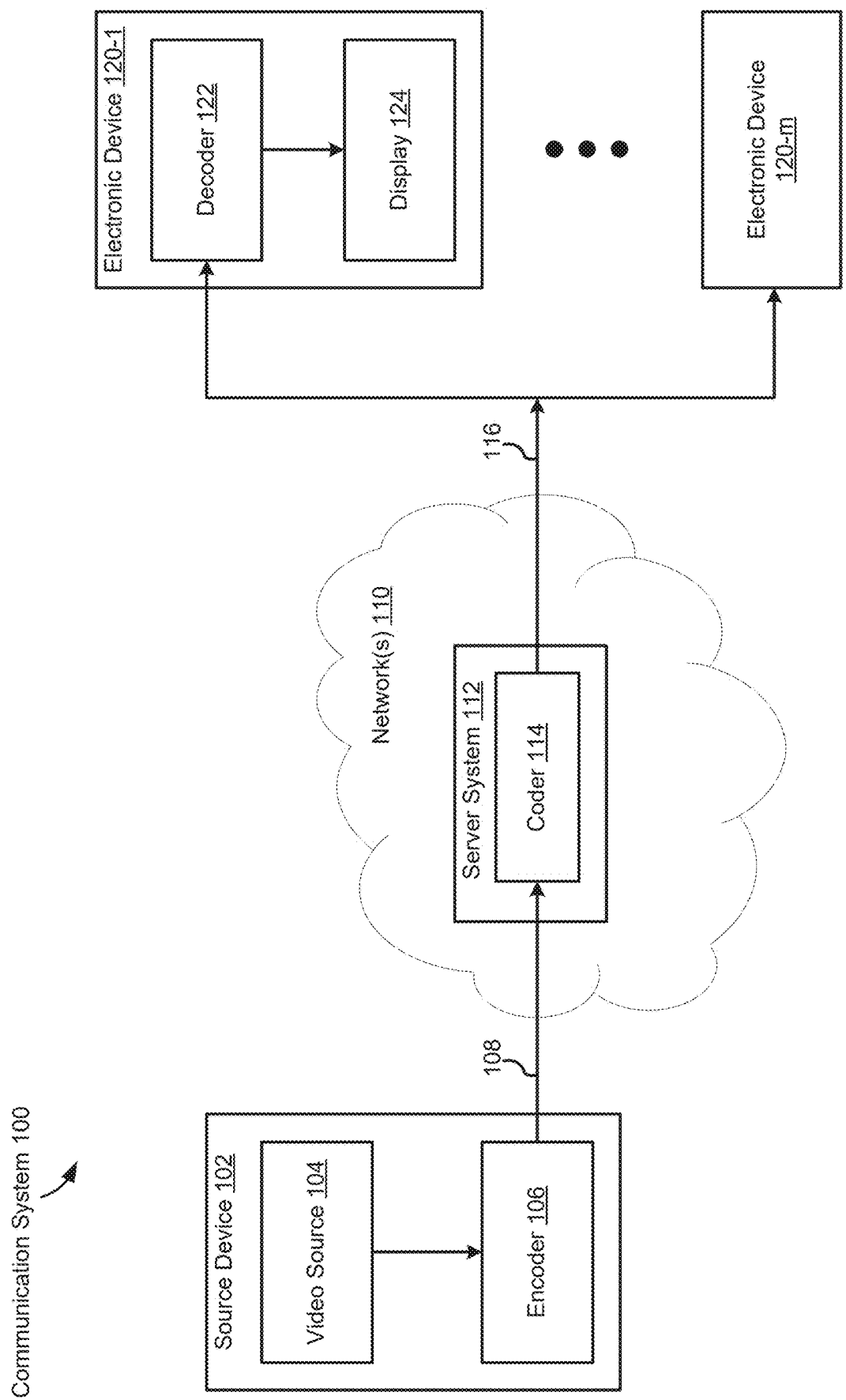
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
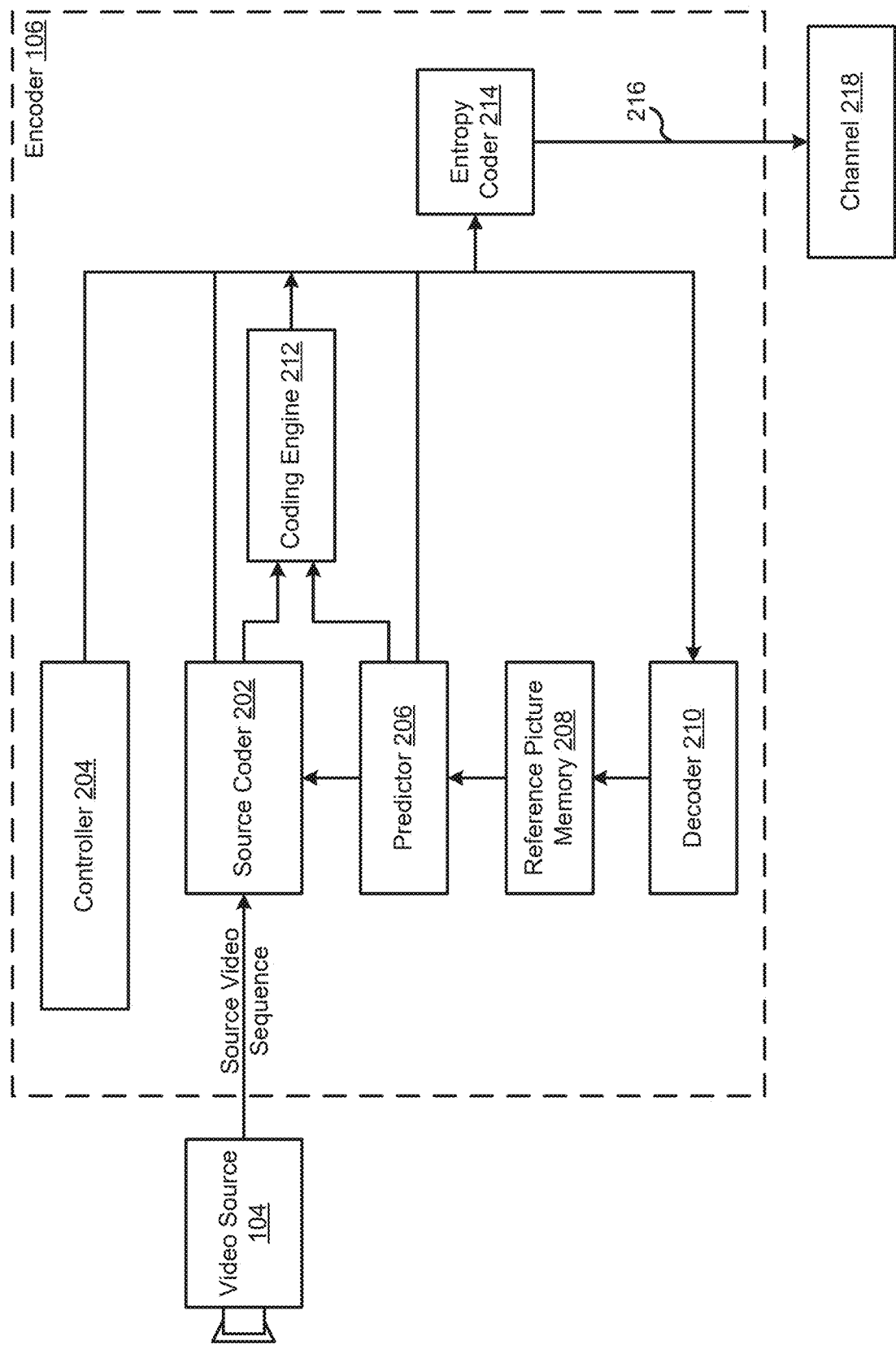
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
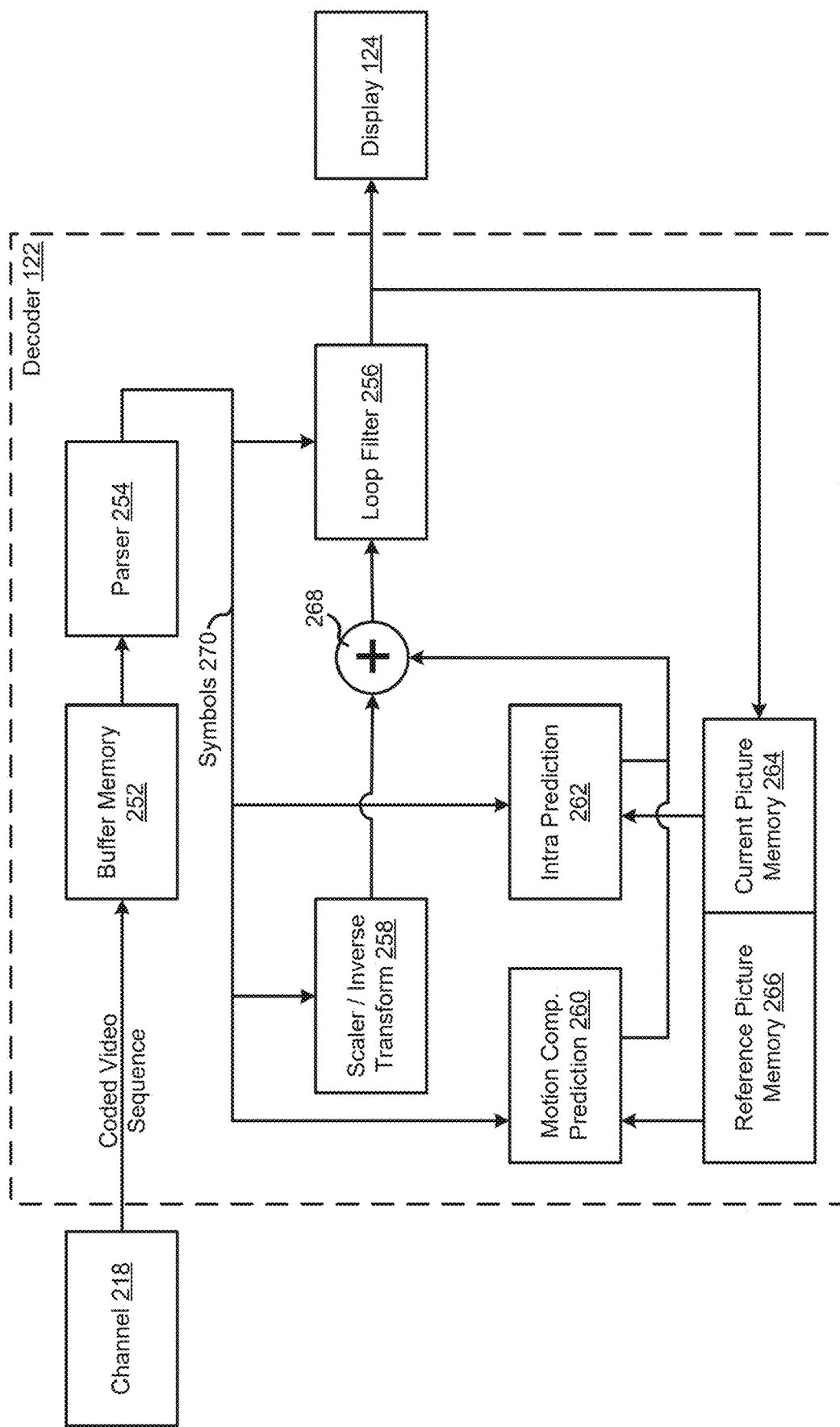
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when subsample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
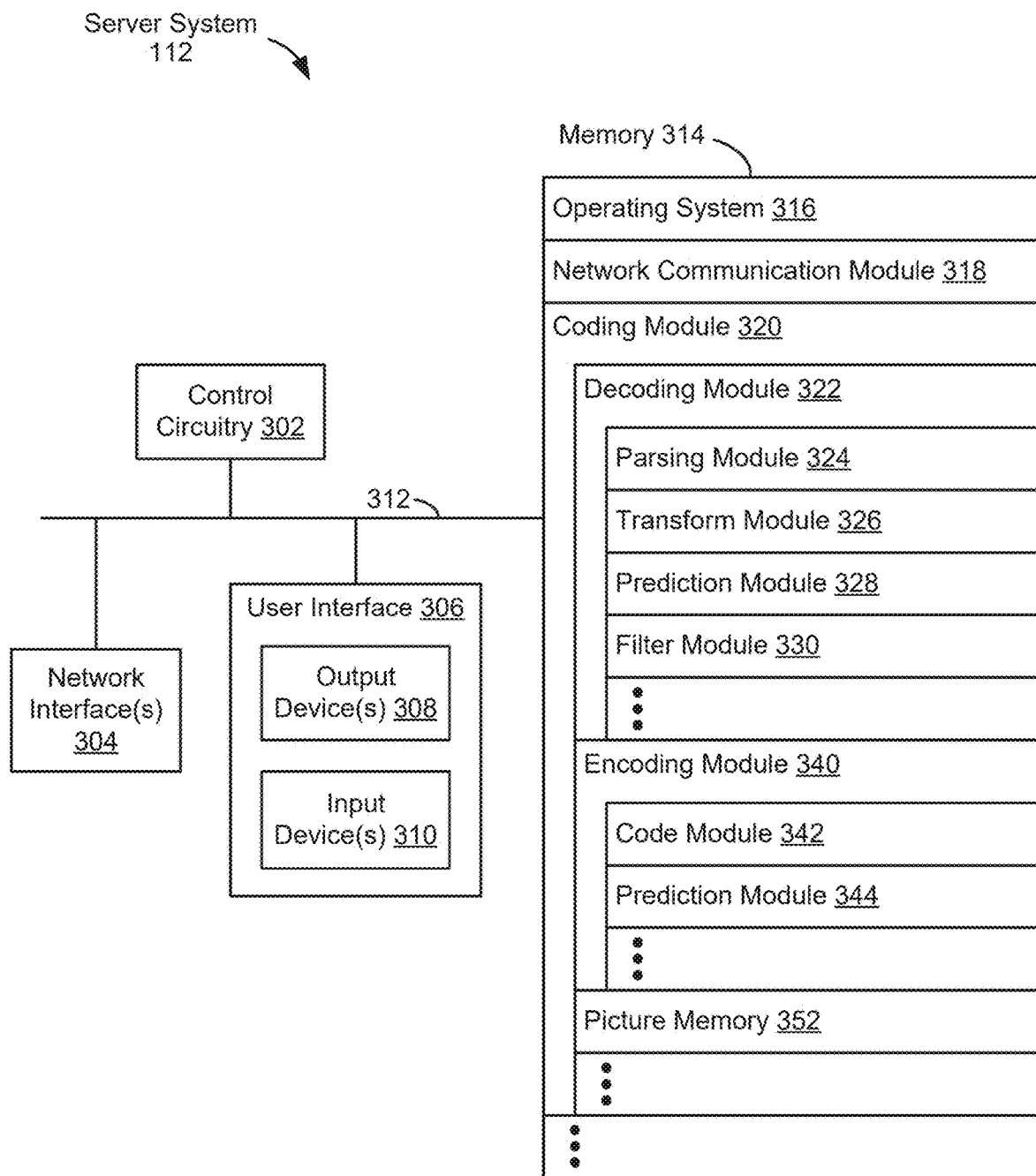
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). As mentioned above, for inter-coded blocks (blocks using inter prediction modes), one or two associated motion vectors are used. These motion vectors may be predicted using a dedicated motion vector predictor, and the disparity between the current motion vector and its corresponding predictor may be conveyed within the bitstream. The motion vector predictor may be identified by an index that corresponds to one entry in a constructed motion vector prediction list. The motion vector prediction list may be constructed based on the motion vectors from spatial neighbors or temporal neighbors. As discussed in more detail below, spatial neighbors include adjacent spatial neighboring blocks, which are direct neighbors of the current block to the top and left sides, as well as non-adjacent spatial neighboring blocks, which are close to, but not directly adjacent to the current block. Temporal MV predictors can be derived using collocated blocks in reference frames. For example, one way to generate temporal MV predictors is to store the MVs of reference frames with reference indices associated with the respective reference frames, then the MVs of a reference frame whose trajectories pass through each 8×8 block of a current frame are identified and stored with the reference frame index in a temporal MV buffer. Thereafter, given predefined block coordinates, the associated MVs stored in the temporal MV buffer are identified and projected onto the current block to derive a temporal MV predictor that points from the current block to its reference frame.

In the following, a motion vector bank refers to a local buffer that stores a group of motion vectors used by coded blocks. The motion vector bank can be utilized to derive a predictor of motion vector of current block. The entries (motion vectors) stored in motion vector bank can be updated during the encoding and decoding.

Figure 4A:
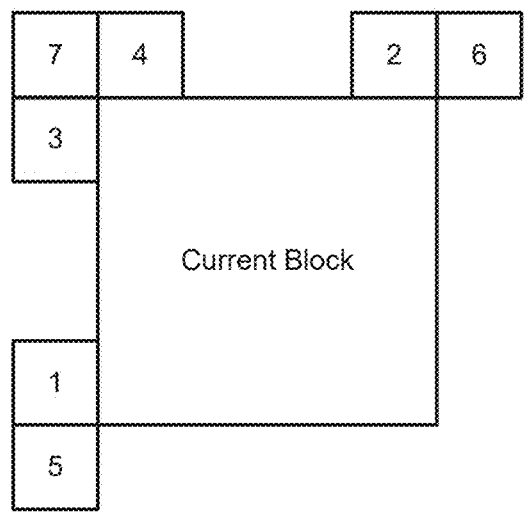
FIGS. 4A-4C illustrate examples of motion vector scanning orders in accordance with some embodiments.
Figure 4B:
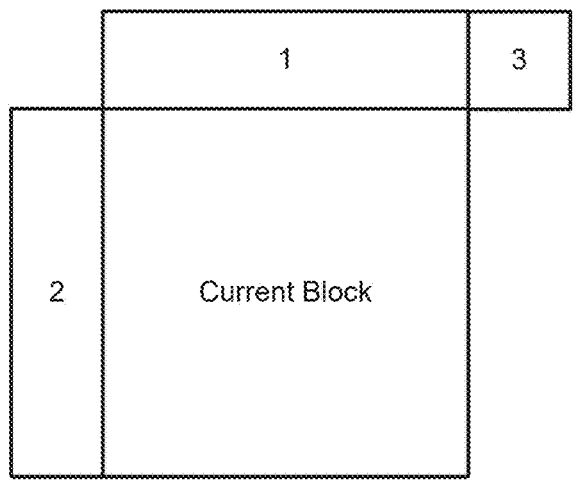
Figure 4C:
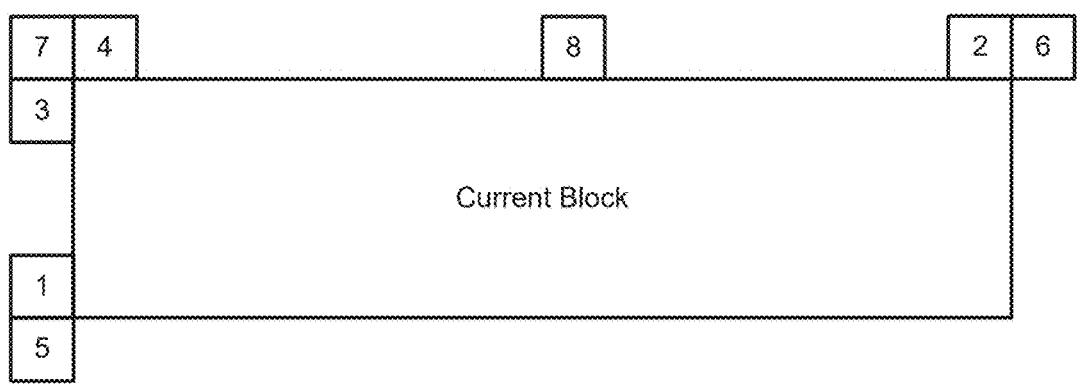

FIGS. 4A-4C illustrate examples of motion vector scanning orders in accordance with some embodiments. FIG. 4A illustrates an example vector scanning order for spatial motion vector predictors. In FIG. 4A, a spatial neighbor (denoted as "1") to the left of the current block (e.g., the bottom-most left block) is scanned first, next a spatial neighbor (denoted as "2") to the left of the current block (e.g., the top-most left block) is scanned. The scanning order continues as illustrated in FIG. 4A until a spatial neighbor (denoted as "7") to the top-left of the current block is scanned. In some embodiments, only a subset of the spatial neighbors shown in FIG. 4A are scanned. For example, only the spatial neighbors coded in an inter mode are scanned. In another example, the scan ends before the top-left spatial neighbor is scanned (e.g., based on one or more decoding settings and/or the motion vectors of the previously scanned spatial neighbors).

FIG. 4B illustrates another example vector scanning order for spatial motion vector predictors. The adjacent SMV candidates for a MVP list may be scanned in the order of, top row, left column, and top-right corner block as shown in FIG. 4B. In some embodiments, an interleaved adjacent SMV predictor (SMVP) scanning is used (e.g., as illustrated in FIG. 4A). For example, the scans for above adjacent row and left adjacent column (as illustrated in FIG. 4B) may be simplified to only include candidates 1, 2, 3, and 4 (as illustrated in FIG. 4A), which are inserted into the MVP list in an interleaved way.

FIG. 4C illustrates another example vector scanning order for spatial motion vector predictors for a non-square current block. For example, in a case that the aspect ratio (w/h or h/w) larger than or equal to 4:1, a middle position candidate along the long edge may be additionally inserted into the MVP list (e.g., the spatial neighbor denoted as "8" in FIG. 4C).

In this way MV candidates may be more efficiently inserted. In some embodiments, the top-left spatial neighbor (denoted as "7" in FIGS. 4A and 4C) is not considered during a non-adjacent SMVP scan. In some embodiments, the weighting and context modeling count for the top-left spatial neighbor are unchanged from conventional methods.

Figure 5A:
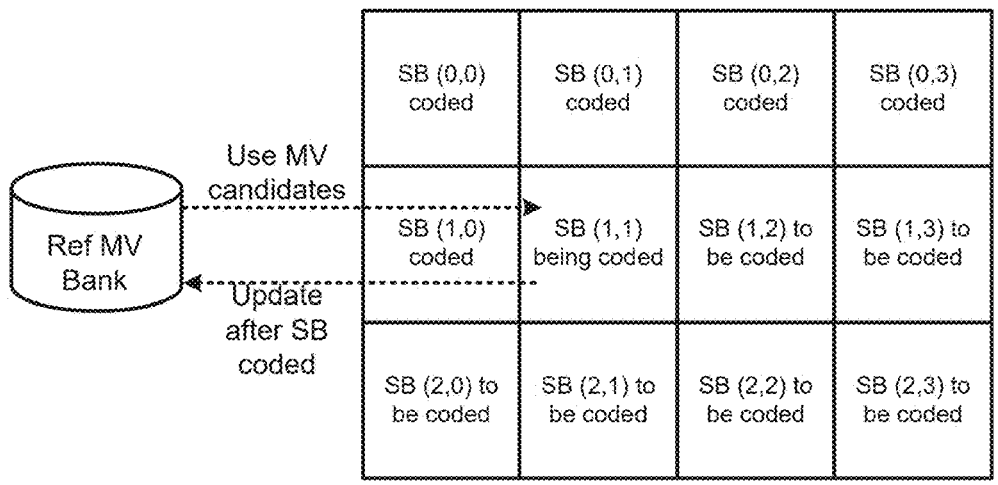
FIG. 5A illustrates example motion vector candidate bank processing in accordance with some embodiments.

In some embodiments, two or more MVP lists are constructed/used. In some embodiments, an MVP list is constructed in the following order: adjacent SMV candidates (e.g., reordered based on weighting), TMV candidates, non-adjacent SMV candidates, derived candidates, and/or extra candidates. In some embodiments, candidate(s) from a MV bank (e.g., as illustrated in FIG. 5A) are inserted at the end of the MVP list. In some embodiments, the reference MV bank is updated after decoding each superblock.

In some embodiments, the MVP list construction process changes based on a mode of the current block (e.g., one for SKIP mode and one for other inter prediction modes). In some embodiments, temporal motion vector (TMV) candidates are scanned after the adjacent spatial motion vector (SMV) candidates. In some embodiments, TMV candidates are scanned after scanning a subset (e.g., the first 1, 2, or 3) of the SMV candidates for a SKIP mode. In some embodiments, when a SKIP mode is active, the TMV candidates are scanned after scanning a position 2 SMV candidate. In some embodiments, when the SKIP mode is inactive, the scan order of TMV candidates is after scanning the adjacent SMV candidate(s).

In some embodiments, the scanning order of the adjacent MVP candidates is interleaved (as illustrated in FIGS. 4A and 4C). In some embodiments, MV bank candidates are conditionally inserted before derived candidates. For example, based on other coded information, MV bank candidates are inserted into the MVP list either before or after one or more derived candidates. For example, the MV bank candidates may be inserted before any derived modes if the width and height of current coded block are both smaller than 16 luma samples. Otherwise, if the width or height are larger than or equal to 16 luma samples, the MV bank candidates may be inserted after any derived modes.

In some embodiments, the MV bank is updated at a block level (e.g., a superblock level). In some embodiments, the MV bank is updated at coding block level (e.g., rather than a superblock level). For example, after each coding block is decoded, the corresponding motion information is updated to the MV bank.

Figure 4D:
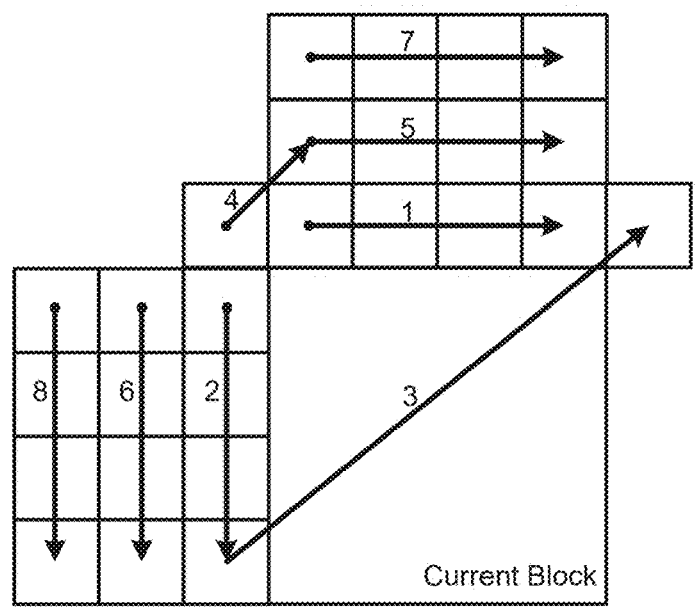
FIG. 4D illustrates a motion vector search point of two reference frames in accordance with some embodiments.

FIG. 4D illustrates a motion vector search point of two reference frames in accordance with some embodiments. In some embodiments, SMVPs are derived from spatial neighboring blocks, including adjacent spatial neighboring blocks, which are direct neighbors of the current block to the top and left sides, as well as non-adjacent spatial neighboring blocks, which are close to, but not directly adjacent to the current block. An example of a set of spatial neighboring blocks for a luma block is illustrated in FIG. 4D (e.g., where each spatial neighboring block is an 8×8 block).

The spatial neighboring blocks may be examined to find one or more MVs that are associated with the same reference frame index as the current block. As an example, for a current block, the search order of spatial neighboring 8×8 luma blocks is as indicated by the numbers 1-8 in FIG. 4D. In some embodiments, less spatial neighboring blocks are scanned (e.g., numbers 5 and 7 are skipped). As an example, first the top adjacent row is checked from left to right. Second, the left adjacent column is checked from top to bottom. Third, the top-right neighbouring block is checked. Fourth, the top-left block neighbouring block is checked. Fifth, the first top non-adjacent row is checked from left to right. Sixth, the first left non-adjacent column is checked from top to bottom. Seventh, the second top non-adjacent row is checked from left to right. Eighth, the second left non-adjacent column is checked from top to bottom.

In some embodiments, the adjacent candidates (e.g., numbers 1-3 in FIG. 4D) are inserted into the MVP list before any temporal MVP (TMVP) candidates. In some embodiments, the non-adjacent (e.g., numbers 4-8 in FIG. 4D) are put into the MV predictor list after one or more TMVP candidates. In this example, all the SMVP candidates have a same reference picture as the current block. If the current block has a single reference picture, the MVP candidate with a single reference picture should have the same reference picture. For a block with compound reference pictures (e.g., 2 reference pictures), one of the reference pictures should be the same reference picture as the current block. If the current block has two reference pictures, only an MVP candidate with both of the same reference pictures is added to the MVP list.

Figure 4E:
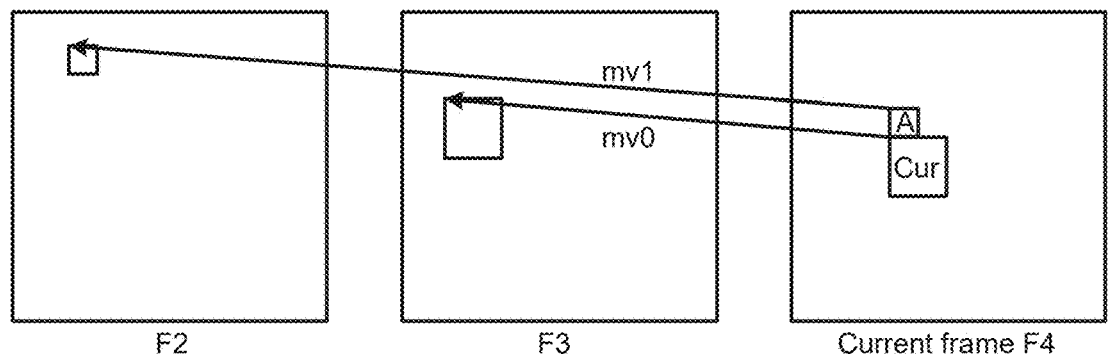
FIG. 4E illustrates example block positions for deriving temporal motion vector predictors in accordance with some embodiments.

FIG. 4E illustrates example block positions for deriving temporal motion vector predictors in accordance with some embodiments. In addition to spatial neighbouring blocks, MV predictors known as temporal MV predictors can also be derived using collocated blocks in reference frames. For example, to generate temporal MV predictors, the MVs of reference frames are stored with reference indices associated with the respective reference frames. Thereafter, for each 8×8 block of the current frame, the MVs of a reference frame whose trajectories pass through the 8×8 block are identified and stored with the reference frame index in a temporal MV buffer. For example, for inter prediction using a single reference frame, regardless of whether the reference frame is a forward or backward reference frame, the MVs are stored in 8×8 units for performing the temporal motion vector prediction of a future frame. As another example, for compound inter prediction, only the forward MVs are stored in 8×8 units for performing the temporal motion vector prediction of a future frame.

In some embodiments, the adjacent SMVP candidates, TMVP candidates, and/or non-adjacent SMVP candidates that are added in the MVP list are reordered. For example, the reordering process may be based on a weight given to each candidate. The weight of a candidate may be predefined based on an overlapping area of the current block and the candidate blocks. In some embodiments, the weighting of non-adjacent (outer) SMVP candidates and TMVP candidates are not considered during the reordering process (e.g., the reordering process only affects adjacent candidates).

The derived MVP candidates may contain both derived MVP for single reference picture and a compound mode. For a single inter prediction, if the reference frame of neighboring block is different from the one of current block, but they are in the same direction, then a temporal scaling algorithm can be utilized to scale the MV to that reference frame in order to form an MVP for the motion vector of current block. FIG. 4E illustrates example motion vector candidate generation for a single inter prediction block in accordance with some embodiments. As shown in FIG. 4E, the mv1 from the neighboring block, A, is utilized to derive the MVP for the motion vector, mv0, of current block with temporal scaling.

Figure 4F:
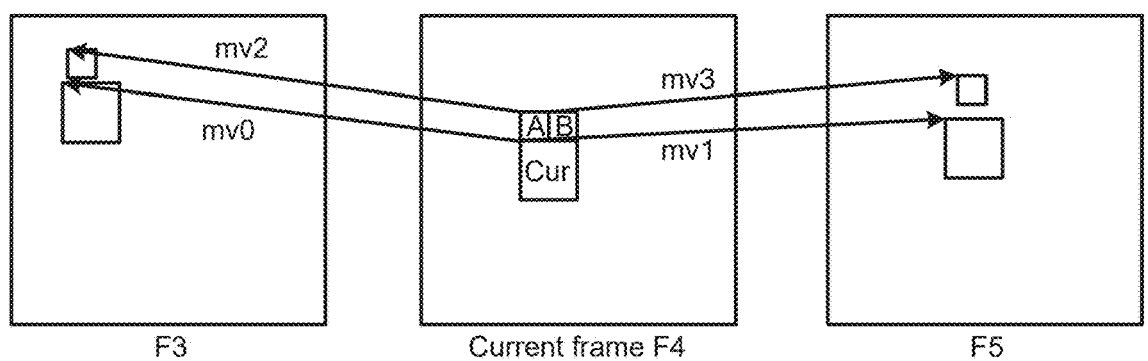
FIG. 4F illustrates example motion vector candidate generation for a single inter prediction block in accordance with some embodiments.

FIG. 4F illustrates example motion vector candidate generation for a single inter prediction block in accordance with some embodiments. For compound inter prediction, the composed MVs from different neighbouring blocks are exploited to derive an MVP of the current block, but the reference frames of the composed MVs may be required to be the same as current block. FIG. 4F illustrates example motion vector candidate generation for a compound prediction block in accordance with some embodiments. As shown in FIG. 4F, the composed MV (mv2, mv3) have the same reference frames as the current block but are from different neighbouring blocks.

Some embodiments include a reference motion vector candidate bank as illustrated in FIG. 5A. For example, each buffer corresponds to a unique reference frame type, corresponding to a single or a pair of reference frames, covering single and compound inter modes respectively. In some embodiments, all the buffers are the same size. In some embodiments, when a new MV is added to a buffer that is full, an existing MV is evicted to make room for the new one.

Coding blocks can refer to the MV candidate bank to collect reference MV candidates, e.g., in addition to the ones obtained with the reference MV list generation described previously. For example, after coding a superblock, the MV bank is updated with the MVs used by the coding blocks of the superblock. Each tile may have an independent MV reference bank that is utilized by all superblocks within the tile. For example, at the beginning of encoding each tile, the corresponding bank is emptied. Thereafter, while coding each superblock within that tile, MVs from the bank may be used as MV reference candidates. At the end of encoding a superblock, the bank is updated.

FIG. 5A illustrates example motion vector candidate bank processing in accordance with some embodiments. As shown in FIG. 5A, the bank updating process may be based on a superblock. For example, after a superblock is coded, the first (e.g., up to 64) candidate MVs used by each coding block inside the superblock are added to the bank. A pruning process may also be involved during the updating. In other embodiments, the bank updating process may be based on a coding block level.

After the reference MV candidate scanning is performed as described previously, if there are open slots in the candidate list, the system may reference the MV candidate bank (e.g., in the buffer with matching reference frame type) for additional MV candidates. For example, going from the end backwards to the start of the buffer, the MV in the bank buffer is appended to the candidate list if it does not already exist in the list.

Figure 5B:
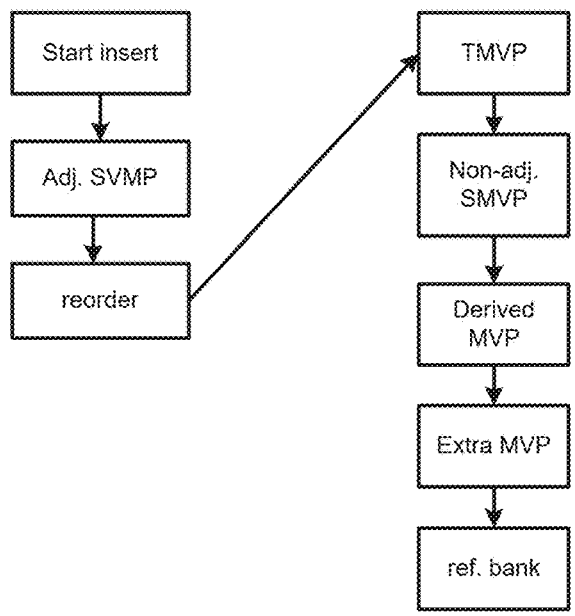
FIG. 5B illustrates an example motion vector predictor list construction order in accordance with some embodiments.
Figure 5C:
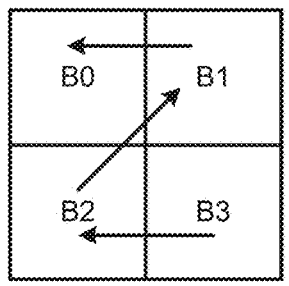
FIG. 5C illustrates an example scan order for motion vector predictor candidate blocks in accordance with some embodiments.

FIG. 5B illustrates an example motion vector predictor list construction order in accordance with some embodiments. In the example of FIG. 5B, the MVP list is constructed by the following order (e.g., with pruning): (i) adjacent SMVP candidates, (ii) reordering process for the existing candidates, (iii) TMVP candidates, (iv) non-adjacent SMVP candidates, (v) derived candidates, (vi) extra MVP candidates, and (vii) candidates from reference MV candidate bank. In some embodiments, only one TMVP candidate can be added into MVP candidate list. For example, once one TMVP candidate is added into MVP list, the remaining TMVP candidate blocks are skipped. In some embodiments, a reversed horizontal scan order is used to check the inner TMVP candidates. An example is shown in FIG. 5C, where the scanning order for inner TMVP candidates are B3→B2→B1→B0. In some embodiments, the outside TMVP candidates are not scanned.

In some embodiments, skip mode motion information fetching of spatial neighboring blocks contains both reference picture indices and motion vectors. The information fetching may include: (i) inserting the MVs from the adjacent spatial neighboring blocks; (ii) inserting temporal motion vector predictors from the reference picture; (iii) inserting the MV from the non-adjacent spatial neighboring blocks; (iv) sorting the MV candidates from the adjacent spatial neighboring blocks; (v) inserting composite MVs when existing list size is less than a predetermined threshold (e.g., less than 2 or 3); and/or (vi) inserting the MVs from reference MV bank. The temporal motions vectors and MVs from the reference MV bank may use the preselected reference picture. For example, the pruning process may take the reference picture index into account.

The slots for MVP candidates are limited to four in some existing processes, e.g., AV2. Moreover, at most one TMVP may be inserted into MVP list regardless of the MVP list length, which may lead to loss of accuracy in the encoding/decoding processes.

In the following, the term "mode 1" is used to refer to a coding mode that inherits neighboring block motion vectors, and the term "mode 2" is used to refer to a coding mode that signals a motion vector difference relative to a motion vector predictor selected from a spatially or temporally neighboring block or one given derived motion vector (such as global motion vector).

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a video bitstream comprising a plurality of blocks (e.g., corresponding to a current picture). The system determines (604) a scanning order for a motion vector list for a current block of the plurality of blocks based on one or more of: a number of neighboring blocks of the current block with corresponding temporal motion vectors, a number of neighboring blocks of the current block encoded in an inter prediction mode, a mode of the current block (e.g., whether the current block uses a first mode in which the current block inherits motion vector(s) from a neighboring block, or a second mode in which a motion vector difference relative to a motion vector predictor selected from a spatially or temporally neighboring block is signaled in the video bitstream), and a reference frame index for the current block. The system generates (606) the motion vector list according to the scanning order. The system identifies (606), from the motion vector list, a motion vector predictor for the current block. The system decodes (608) the current block using the identified motion vector predictor. For example, when deriving the motion vector predictor for the current block, the scanning order of spatial motion vectors, temporal motion vectors, and derived motion vectors may depend on the coded information from the bitstream, including but not limited to the inter prediction mode, and reference frame index from current block and its neighboring blocks.

In some embodiments, the temporal motion vector is scanned before all the spatial motion vectors for mode 1 whereas at least one spatial motion vector is scanned before temporal motion vectors for mode 2. For example, the temporal motion vector is scanned before all the spatial motion vectors for mode 1 (e.g., a coding mode that inherits neighboring block motion vectors) whereas at least one spatial motion vector is scanned before temporal motion vectors for mode 2 (e.g., a coding mode that signals motion vector difference relative to a motion vector predictor selected from a spatially or temporally neighboring block). As an example, mode 1 is skip mode, and mode 2 is other inter prediction modes except skip mode.

In some embodiments, temporal motion vectors are scanned before at least one of the adjacent spatial motion vectors for mode 1. In some embodiments, the maximum number of added temporal motion vectors depends on the count of spatial neighbors included in the motion vector prediction list. In some embodiments, the maximum number of added temporal motion vectors decreases as the count of spatial neighbors included in the motion vector prediction list increases. In some embodiments, the maximum number of added temporal motion vectors is N1 when the count of spatial neighbors included in the motion vector prediction list is less than or equal to one threshold T1. Otherwise, when the count of spatial neighbors included in the motion vector prediction list is greater than this threshold T1, the maximum number of added temporal motion vector is N2. In one example, both N1 and N2 are positive integers, but N2 is smaller than N1. In another example, N1 is set to 2 and N2 is set to 1.

In some embodiments, more than one temporal motion vector is scanned for generating motion vector prediction list, where one of the temporal motion vectors are scanned before at least one adjacent spatial motion vector, and at least one of the temporal motion vectors are scanned after all the adjacent spatial motion vectors. In some embodiments, the maximum number of added temporal motion vectors depends on the inter prediction mode of neighboring blocks. In some embodiments, the maximum number of added temporal motion vectors depends on the number of neighboring blocks using temporal motion vector as predictor. In one example, if multiple neighboring blocks are using temporal motion vector as predictor, then the maximum number of added temporal motion vectors can be increased. In some embodiments, the maximum number of added temporal motion vectors depends on the temporal layer ID.

In some embodiments, motion vectors stored in the bank are not scanned to generate the motion vector prediction list for mode 1 whereas motion vectors in the bank are scanned for other modes except mode 1. In some embodiments, derived motion vectors are not scanned to generate the motion vector prediction list for mode 1 whereas motion vectors in the bank are scanned for other modes except mode 1. In some embodiments, the selection of scanning order of spatial motion vectors, temporal motion vectors, and derived motion vectors, when deriving the motion vector predictor for the current block, is signaled in high-level syntax, including but not limited to sequence header, picture header, subpicture header, slice header, tile header. In some embodiments, a set of fixed scanning orders are predefined, and the selected index of the scanning order is signaled.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data comprising a plurality of blocks including a current block (e.g., the plurality of blocks corresponding to a current picture). The system determines (654) a scanning order for a motion vector list for the current block based on coded information. In some embodiments, the coded information includes one or more of: (i) a number of neighboring blocks of the current block with corresponding temporal motion vectors, (ii) a number of neighboring blocks of the current block encoded in an inter prediction mode, (iii) a first mode of the current block in which the current block inherits one or more motion vectors from a neighboring block, and (iv) a second mode of the current block in which a motion vector difference relative to a motion vector predictor selected from a spatially or temporally neighboring block is used. The system generates (656) the motion vector list according to the scanning order. The system identifies (658), from the motion vector list, a motion vector for the current block. The system encodes (660) the current block using the identified motion vector. As described previously, the encoding process may mirror the decoding processes described herein (e.g., motion vector list construction and use). For brevity, those details are not repeated here.

Although FIGS. 6A and 6B illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof. Turning now to some example embodiments.

(A1) In one aspect, some embodiments include a method (e.g., the method 500) of video decoding. In some embodiments, the method is performed at a computing system (e.g., the server system 112) having memory and one or more processors. In some embodiments, the method is performed at a coding module (e.g., the coding module 320). The method includes: (i) receiving a video bitstream (e.g., a coded video sequence) comprising a plurality of blocks (e.g., corresponding to one or more pictures); (ii) determining a scanning order for a motion vector list for a first block of the plurality of blocks based on one or more of: (a) a number of neighboring blocks of the current block with corresponding temporal motion vectors; (b) a number of neighboring blocks of the current block encoded in an inter prediction mode; (c) a mode of the current block; and (d) a reference frame index for the current block; (iii) generating the motion vector list according to the scanning order; (iv) identifying, from the motion vector list, a motion vector predictor for the current block; and (v) decoding the current block using the identified motion vector predictor. For example, when deriving the motion vector predictor for the current block, the scanning order of spatial motion vectors, temporal motion vectors, and derived motion vectors may depend on the coded information from the bitstream, including but not limited to the inter prediction mode, and reference frame index from current block and its neighboring blocks.

(A2) In some embodiments of A1, when the mode of the current block comprises inheriting one or more neighboring block motion vectors: (i) the scanning order comprises scanning a set of spatial motion vectors; and (ii) the scanning order comprises scanning at least one temporal motion vector before scanning all of the set of spatial motion vectors. For example, the temporal motion vector is scanned before all the spatial motion vectors when the current block is in a coding mode that inherits neighboring block motion vectors. In some embodiments, in accordance with a determination that the mode of the current block comprises inheriting one or more neighboring block motion vectors, the scanning order comprises scanning a set of spatial motion vectors; and the scanning order comprises scanning at least one temporal motion vector before scanning the entire set of spatial motion vectors. In some embodiments, in accordance with a determination that the mode of the current block comprises inheriting one or more neighboring block motion vectors, the scanning order comprises scanning a set of spatial motion vectors; and the scanning order comprises scanning at least one temporal motion vector before scanning the entire set of spatial motion vectors.

(A3) In some embodiments of A2, the mode of the current block comprises a skip mode.

(A4) In some embodiments of A2 or A3, the at least one temporal motion vector is scanned before at least one adjacent spatial motion vector. For example, temporal motion vectors are scanned before at least one of the adjacent spatial motion vectors when the current block is in a coding mode that inherits neighboring block motion vectors.

(A5) In some embodiments of any of A1-A4, when the mode of the current block comprises using a motion vector difference: (i) the scanning order comprises scanning a set of spatial motion vectors; and (ii) the scanning order comprises scanning at least one spatial motion vector before scanning a temporal motion vector. For example, at least one spatial motion vector is scanned before temporal motion vectors when the current block is in a coding mode that signals motion vector difference relative to a motion vector predictor selected from a spatially or temporally neighboring block or one given derived motion vector (such as global motion vector). In some embodiments, in accordance with a determination that the mode of the current block comprises using a motion vector difference: the scanning order comprises scanning a set of spatial motion vectors; and the scanning order comprises scanning at least one spatial motion vector before scanning a temporal motion vector.

(A6) In some embodiments of A4 or A5, the mode of the current block comprises a non-skip inter prediction mode.

(A7) In some embodiments of any of A1-A6, a maximum number of temporal motion vectors in the motion vector list depends on a count of spatial neighbor motion vectors included in the motion vector list. For example, the maximum number of added temporal motion vectors depends on the count of spatial neighbors included in the motion vector prediction list. For example, the maximum number of added temporal motion vectors decreases as the count of spatial neighbors included in the motion vector prediction list increases. As another example, the maximum number of added temporal motion vectors is N1 when the count of spatial neighbors included in the motion vector prediction list is less than or equal to one threshold T1. Otherwise, when the count of spatial neighbors included in the motion vector prediction list is greater than this threshold T1, the maximum number of added temporal motion vector is N2. As an example, both N1 and N2 are positive integers, but N2 is smaller than N1 (e.g., N1=2 and N2=1).

(A8) In some embodiments of any of A1-A7, a maximum number of temporal motion vectors in the motion vector list depends on a count of neighboring blocks having an inter prediction mode. For example, the maximum number of added temporal motion vectors depends on the inter prediction mode of neighboring blocks.

(A9) In some embodiments of A8, the count of neighboring blocks having the inter prediction mode consists of a count of neighboring blocks using a temporal motion vector as a predictor. For example, the maximum number of added temporal motion vectors depends on the number of neighboring blocks using temporal motion vector as predictor. As an example, if multiple neighboring blocks are using temporal motion vector as predictor, then the maximum number of added temporal motion vectors can be increased.

(A10) In some embodiments of A8 or A9, the maximum number of temporal motion vectors in the motion vector list further depends on a temporal layer identifier. For example, the maximum number of added temporal motion vectors depends on the temporal layer ID.

(A11) In some embodiments of any of A1-A10, the scanning order comprises: (i) scanning a first temporal motion vector before scanning a spatial motion vector corresponding to an adjacent block; and (ii) scanning a second temporal motion vector after scanning the spatial motion vector. For example, more than one temporal motion vectors are scanned for generating motion vector prediction list, where one of the temporal motion vectors are scanned before at least one adjacent spatial motion vector, and at least one of the temporal motion vectors are scanned after all the adjacent spatial motion vectors.

(A12) In some embodiments of any of A1-A11, the method further including: (i) when the mode of the current block comprises a first mode, the scanning order does not include scanning a motion vector bank; and (ii) when the mode of the current block comprises a second mode, the scanning order does includes scanning the motion vector bank. For example, motion vectors stored in the bank are not scanned to generate the motion vector prediction list when the mode of the current block comprises inheriting one or more neighboring block motion vectors whereas motion vectors in the bank are scanned for other modes.

(A13) In some embodiments of any of A1-A12, the method further including: (i) when the mode of the current block comprises a first mode, the scanning order does not include scanning derived motion vectors; and (ii) when the mode of the current block comprises a second mode, the scanning order does includes scanning the derived motion vectors. For example, motion vectors stored in the bank are not scanned to generate the motion vector prediction list when the mode of the current block comprises inheriting one or more neighboring block motion vectors whereas motion vectors in the bank are scanned for other modes.

(A14) In some embodiments of any of A1-A13, the scanning order is further based on a signaled indicator from the video bitstream. For example, the selection of scanning order of spatial motion vectors, temporal motion vectors, and derived motion vectors, when deriving the motion vector predictor for the current block, is signaled in high-level syntax.

(A15) In some embodiments of A14, the scanning order is selected from a predefined set of scanning orders based on a signaled index. For example, a set of fixed scanning orders are predefined, and the selected index of the scanning order is signaled.

(B1) In another aspect, some embodiments include a method (e.g., the method 550) of video encoding. In some embodiments, the method is performed at a computing system (e.g., the server system 112) having memory and one or more processors. In some embodiments, the method is performed at a coding module (e.g., the coding module 320). The method includes: (i) receiving video data comprising a plurality of blocks including a current block (e.g., the plurality of blocks corresponding to one or more pictures); (ii) determining a scanning order for a motion vector list for the current block based on coded information; (iii) generating the motion vector list according to the scanning order; (iv) identifying, from the motion vector list, a motion vector for the current block; and (v) encoding the current block using the identified motion vector.

(B2) In some embodiments of B1, the scanning order comprises scanning at least one temporal motion vector before scanning a spatial motion vector.

(B3) In some embodiments of B1 or B2, the scanning order is based on whether a coding mode for the current block comprises using a motion vector difference.

(B4) In some embodiments of any of B1-B3, the scanning order is based on whether a coding mode for the current block comprises a skip mode.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A15 and B1-B4 above). In yet another aspect, some embodiments include a non-transitory computer-readable storage medium storing one or more sets of instructions for execution by control circuitry of a computing system, the one or more sets of instructions including instructions for performing any of the methods described herein (e.g., A1-A15 and B1-B4 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "when" can be construed to mean "if" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context. As used herein, N refers to a variable number. Unless explicitly stated, different instances of N may refer to the same number (e.g., the same integer value, such as the number 2) or different numbers.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving a video bitstream comprising a plurality of blocks in a current picture;
   determining a scanning order for a motion vector list for a current block of the plurality of blocks based a skip mode of the current block;
   when the skip mode is active for the current block, the scanning order comprises scanning temporal motion vector candidates after scanning one or more spatial motion vector candidates;
   when a non-skip mode is active for the current block, the scanning order comprises scanning the temporal motion vector candidates before scanning the one or more spatial motion vector candidates;
   constructing the motion vector list according to the scanning order;
   identifying, from the motion vector list, a motion vector predictor for the current block; and
   decoding the current block using the identified motion vector predictor.

2. The method of claim 1, wherein the one or more spatial motion vector candidates comprises at least one adjacent spatial motion vector candidate.

3. The method of claim 1, wherein the non-skip mode comprises a non-skip inter prediction mode.

4. The method of claim 1, wherein a maximum number of temporal motion vectors in the motion vector list depends on a count of spatial neighbor motion vectors included in the motion vector list.

5. The method of claim 1, wherein a maximum number of temporal motion vectors in the motion vector list depends on a count of neighboring blocks having an inter prediction mode.

6. The method of claim 5, wherein the count of neighboring blocks having the inter prediction mode consists of a count of neighboring blocks using a temporal motion vector as a predictor.

7. The method of claim 5, wherein the maximum number of temporal motion vectors in the motion vector list further depends on a temporal layer identifier.

8. The method of claim 1, wherein, when the skip mode is inactive for the current block, the scanning order comprises:
   scanning a first temporal motion vector before scanning a spatial motion vector corresponding to an adjacent block; and
   scanning a second temporal motion vector after scanning the spatial motion vector.

9. The method of claim 1, further comprising:
   when a mode of the current block comprises the skip mode, the scanning order does not include scanning a motion vector bank; and
   when the mode of the current block comprises the non-skip mode, the scanning order includes scanning the motion vector bank.

10. The method of claim 1, further comprising:
    when a mode of the current block comprises the skip mode, the scanning order does not include scanning derived motion vectors; and
    when the mode of the current block comprises the a non-skip mode, the scanning order includes scanning the derived motion vectors.

11. The method of claim 1, wherein the scanning order is further based on a signaled indicator from the video bitstream.

12. The method of claim 11, wherein the scanning order is selected from a predefined set of scanning orders based on a signaled index.

13. A computing system, comprising:
    control circuitry;
    memory; and
    one or more sets of instructions stored in the memory and configured for execution by the control circuitry, the one or more sets of instructions comprising instructions for:
      receiving video data comprising a plurality of blocks corresponding to a current picture, the plurality of blocks including a current block;
      determining a scanning order for a motion vector list for the current block based on a skip mode of the current block;
      when the skip mode is active for the current block, the scanning order comprises scanning temporal motion vector candidates after scanning one or more spatial motion vector candidates;
      when a non-skip mode is active for the current block, the scanning order comprises scanning the temporal motion vector candidates before scanning the one or more spatial motion vector candidates;
      generating the motion vector list according to the scanning order;
      identifying, from the motion vector list, a motion vector for the current block; and
      encoding the current block using the identified motion vector.

14. The computing system of claim 13, wherein the one or more spatial motion vector candidates comprises at least one adjacent spatial motion vector candidate.

15. The computing system of claim 13, wherein the non-skip mode comprises a non-skip inter prediction mode.

16. The computing system of claim 13, further comprising signaling an index for the scanning order in a video bitstream.

17. The computing system of claim 13, wherein a maximum number of temporal motion vectors in the motion vector list depends on a count of spatial neighbor motion vectors included in the motion vector list.

18. The computing system of claim 13, wherein a maximum number of temporal motion vectors in the motion vector list depends on a count of neighboring blocks having an inter prediction mode.

19. A method of video media bitstream generation, the method comprising:
    generating a video bitstream, including:
        determining a scanning order for a motion vector list for a current block of video data based on a skip mode of the current block;
        when the skip mode is active for the current block, the scanning order comprises scanning temporal motion vector candidates after scanning one or more spatial motion vector candidates;
        when a non-skip mode is active for the current block, the scanning order comprises scanning the temporal motion vector candidates before scanning the one or more spatial motion vector candidates;
        generating the motion vector list according to the scanning order;
        identifying, from the motion vector list, a motion vector for the current block; and
        encoding the current block using the identified motion vector; and
    transmitting the video bitstream including the encoded current block.

20. The method of claim 19, wherein the one or more spatial motion vector candidates comprises at least one adjacent spatial motion vector candidate.

* * * * *